United States Patent [19]

Kristola et al.

[11] Patent Number: 4,692,983

[45] Date of Patent: Sep. 15, 1987

[54] METHOD AND INSTALLATION FOR FITTING NUTS TO A WORKPIECE

[75] Inventors: Osvald Kristola; Paavo Korpela, both of Robertsfors, Sweden

[73] Assignee: ASEA Aktiebolag, Västerås, Sweden

[21] Appl. No.: 848,291

[22] Filed: Apr. 4, 1986

[30] Foreign Application Priority Data

Apr. 9, 1985 [SE] Sweden ................. 8501734

[51] Int. Cl.⁴ ............... B23P 11/00; B23P 21/00; B23P 19/00; B23Q 15/00
[52] U.S. Cl. ........................... 29/432; 29/716; 29/798; 901/41
[58] Field of Search ............ 29/432, 798, 716, 809; 901/41

[56] References Cited

U.S. PATENT DOCUMENTS

| | | | |
|---|---|---|---|
| 3,878,596 | 4/1975 | Dwai | 901/41 X |
| 4,076,131 | 2/1978 | Dahlstrom et al. | 901/41 X |
| 4,224,731 | 9/1980 | Lingle | 29/716 X |
| 4,348,796 | 9/1982 | Smallegan | 29/798 X |
| 4,384,403 | 5/1983 | Sheldon et al. | 29/798 |
| 4,424,623 | 1/1984 | Bailey | 29/716 |
| 4,442,584 | 4/1984 | Smallegan | 29/432 |
| 4,505,416 | 3/1985 | Smallegan | 29/432 X |
| 4,635,328 | 1/1987 | Palmer | 901/41 UX |
| 4,636,135 | 1/1987 | Bancon | 901/41 X |

FOREIGN PATENT DOCUMENTS 73245  4/1984  Japan ................. 901/41

Primary Examiner—Charlie T. Moon
Attorney, Agent, or Firm—Watson, Cole, Grindle & Watson

[57] ABSTRACT

The invention relates to a method and to an installation for fitting nuts to a sheet-metal workpiece, by punching the nuts thereinto. In order to provide a rational and flexible nut punching system which can be readily adapted to serve mutually different workpieces, it is proposed in accordance with the invention that the workpiece is securely positioned in a fixture; that a portable nut punching tool is fitted to a tool attachment provided on the wrist of an industrial robot; that the robot positions the nut punching tool sequentially in pre-determined locations on the workpiece to which nuts are to be fitted; and that the nut punching tool is activated in such locations so as to punch nuts securely into the sheet-metal workpiece.

8 Claims, 3 Drawing Figures

METHOD AND INSTALLATION FOR FITTING NUTS TO A WORKPIECE

The present invention relates to a method and to an installation for fitting nuts to a sheet-metal workpiece, by punching the nuts thereinto.

It is known to fit nuts to sheet-metal workpieces by using the nuts themselves to punch holes in the workpiece and simultaneously securing the n-ut thereto in conjunction therewith. To this end there is used a punch which has on one side thereof a punch head which incorporates an axially movable press rod, and on the other side thereof a punch die which is located opposite the punch head and spaced therefrom. Thus, when fitting a plurality of nuts simultaneously to such a sheet-metal workpiece, a corresponding number of nut punching tools are set up in a stationery press tool, so that all nuts are fitted in their respective positions in the workpiece at one and the same time.

One drawback with this arrangement is that the stationery press tool is res tricted to solely one specific workpiece, in other words a separate array of punches must be set-up for each workpiece concerned. When manufacturing the driver's cabins of lorries or trucks for eample, there is involved a large number of different sheet-metal components into which nuts are to be punched, and hence the need to set-up the punch tool for each component renders the task structurally very expensive, in addition to taking a relatively long time to carry out. Another drawback, or problem, is that the nuts cannot be fitted readily to workpiece surfaces which slope in mutually different planes.

For the purpose of eliminating these and other deficiencies there is proposed in accordance with the invention a method and an installation with which the aforesaid problems are solved in a rational and flexible manner, by enabling nuts of mutually different thread dimensions to be fitted in selected positions and in a selected sequence a plurality of mutually different sheet-metal workpieces with the aid of solely one punching tool.

To this end there is proposed in accordance with the invention a method which is characterized by securing the workpiece in a fixture or jig herefor; fitting a portable nut punch to a tool attachment provided on the wrist of an industrial robot; with the aid of the robot, aligning the nut punch sequentially with pre-determined locations on the workpiece to which nuts are to be fitted; and then activating the punch tool in a manner to fit and secure a nut by punching the nut into the workpiece. By fitting a portable nut punch to the wrist of an industrial robot, nuts can be punched into selected locations and in selected positions on the respective workpieces, by suitable programming of the robot and by utilizing its speed and mobility in various different degrees of freedom.

The novel method of punching nuts into sheet-metal workpieces with the aid of an industrial robot enables whole sequences of working steps carried out in conjunction with the punching operation to be performed in a particularly rational and efficient manner; the robot is namely programmed to collect and position the workpieces in a fixture in which the workpieces are held secure during a punching operation, to remove the workpieces from the fixture, and to deliver said workpieces to an output magazine.

To this end, the robot is first fitted with a gripping device with which it collects a workpiece from an input magazine and places the workpiece in the fixture, whereafter the gripping device is removed and replaced with the portable nut punch which is loaded with the requisite number of nuts, either prior to being fitted to the punch or subsequent thereto. The nuts are then punched into the workpiece located in the fixture and, when all nuts have been punched into the workpiece, the nut punch is substituted for the gripping device and the workpiece is removed from the fixture with the aid of said device and placed in the output magazine.

If desired, the input magazine can be loaded with several different types of sheet-metal components. In this case, the component to be selected is first identified, whereafter a control system selects a program intended for the indentified component, after which the robot is caused to collect the gripping device intended for the workpiece in question and used to place the workpiece in the fixture; the punch tool is loaded with the requisite number of nuts and the correct type of nuts for the workpiece in question; the robot is caused to change the gripping device for the punch tool and to perform a given sequence of nut-punching operations with respect to the workpiece in question; and the punch tool is changed for the gripping device with which the workpiece is removed from the fixture and placed into the output magazine.

The punch tool is provided with its own individual nut magazine, which can be loaded with various nuts in a nut loading station, in the numbers and in the sequence dictated by the workpiece or component in question.

The characteristic features of the particular robot installation for carrying out the method are set forth in the following apparatus claims.

The invention will now be described in more detail with reference to the accompanying drawings, in which FIG. 1 is a schematic plan view of a robot installation which operates in accordance with the novel principles of the invention;

Figure 1:
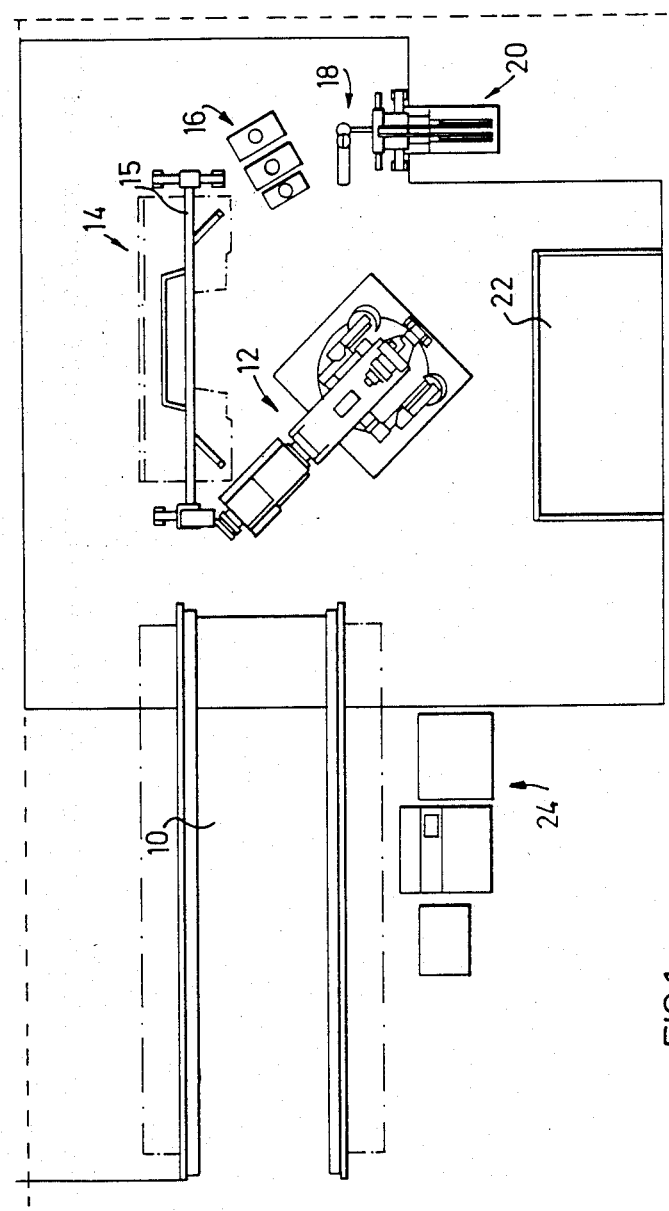

FIG. 1 illustrates schematically an installation which is intended for punching nuts into sheet-metal workpieces and which comprises an input magazine 10, an industrial robot 12, a fixture or jig 14 in which the workpiece is held positioned during a nut-punching operation, a tool magazine 16 which stores gripping devices adapted for use with mutually different workpieces, a stand 18 which supports a punch stirrup or bracket structure 21, an automatically operating nut loading device 20 which prepares a requisite set of nuts to be loaded into the punch tool carried by the punch stirrup, and an output magazine 22 in which the punched workpieces are stored. The reference 24 identifies schematically illustrated control equipment for controlling robot movement and the installation in general.

Figure 2:
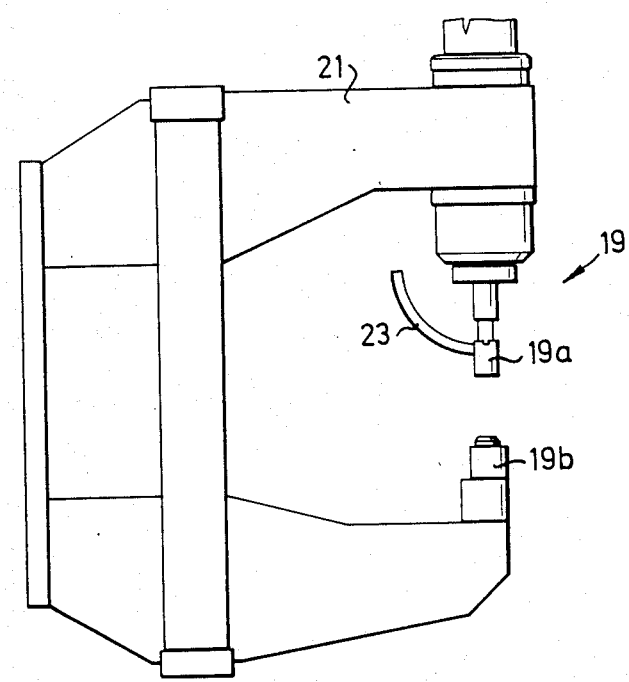
FIG. 2 illustrates schematically a portable punch tool.
Figure 3:
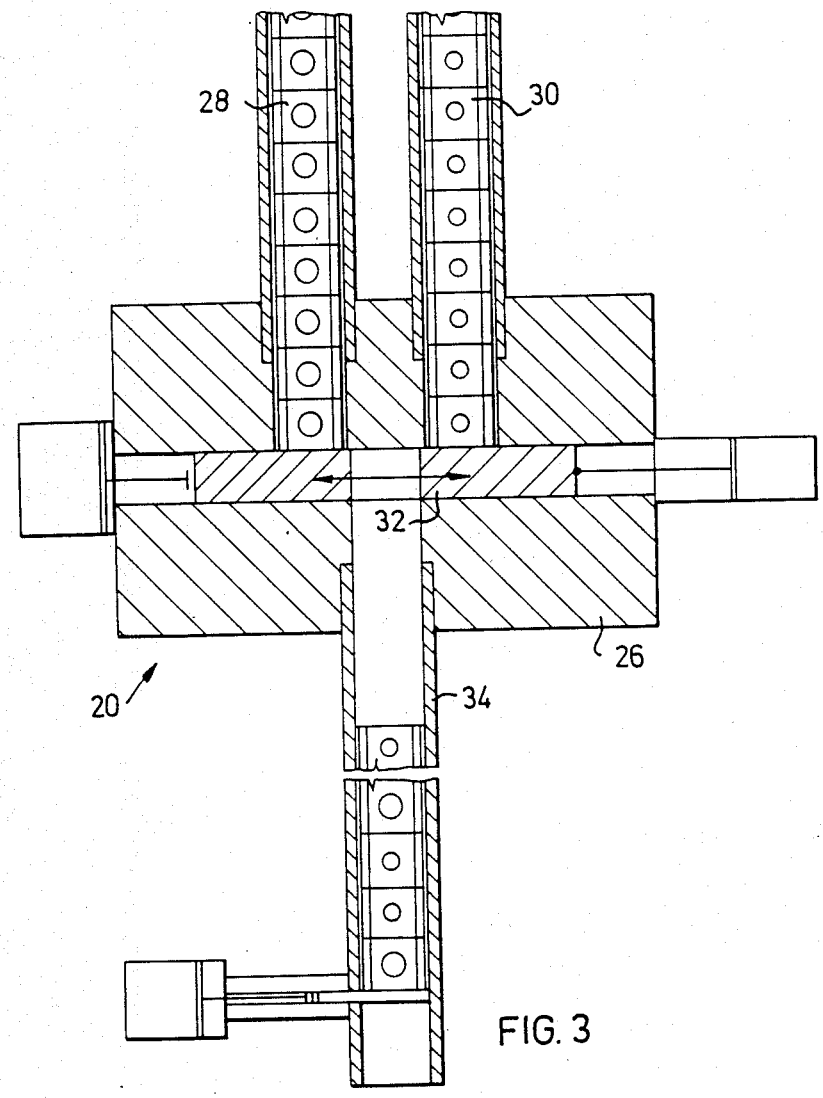
FIG. 3 is a cross-sectional view of a nut loading device.

As illustrated in FIG. 2, the actual punch tool 19 comprises, in a known manner, a punch head 19a, which has a press rod mounted thereon, and an oppositely located press-die 19b, and is supported by a substantially C-shaped stirrup or bracket structure 21, which is made of a carbon-fibre reinforced plastics material, in order to provide a structure which is both light in weight and stable. The weight of the punch stirrup 21 can be reduced by providing the stirrup with a separate nut magazine 23 whose capacity is limited to that required for punching solely one workpiece. The magazine 23 is loaded into the nut loading device 20, shown in greater detail in FIG. 3. The punch stirrup is provided with coupling means (not shown), located suitably on the upper leg of the stirrup structure, for connection to a corresponding coupling means provided on the wrist of the robot 12. The nut loading device 20 has a housing 26 to which there are connected two nut magazines 28 and 30, of which magazines one may contain nuts provided with an M8-screwthread and the other nuts provided with an M6-screwthread. Both types of nuts have the same external shape and dimensions. A change-over slide 32 located in the housing 26 is arranged to feed nuts in desired numbers and the desired screwthread into a nut outlet channel 34, and in the sequence required by the workpiece in question. When loading the punch tool, the nut magazine 23 thereof is connected to the lower end of the nut outlet channel 34.

The input magazine 10 is loaded with workpieces, which may be of mutually the same kind or comprise a variety of different workpieces. That workpiece first in line to be punched is advanced in the input magazine 10 to a collecting station in readiness for the robot 12. The workpiece in question is identified with the aid of means not shown, wherewith the control equipment 24 selects a program pre-determined in respect of the identified workpiece. The robot 12 is then instructed to collect the correct gripping device for the workpiece concerned. The nut loading device 20 is then activated to feed nuts from the magazines 28 and 30 into the nut outlet channel 34, these nuts being fed in the correct number, the correct type, and in the desired sequence. The robot 12 collects the workpiece from the input magazine and places the workpiece in the fixture 14, which holds the workpiece firmly in the correct position. The robot then replaces the gripping device in the tool magazine 16 and collects the punch stirrup 21 from its stand 18. The magazine 23 of the punch tool is then connected to the outlet channel 34 of the nut loading device and loaded with nuts. The robot 12 now punches nuts into the workpiece held in the fixture 14, in accordance with the program selected. The fixture 14 is conveniently capable of being pivoted about an axis 15, so as to enable the workpiece to be turned and therewith improve accessibility and facilitate fitting of the nuts to all sides of the workpiece. When the workpiece has been fitted with the requisite number of nuts, the robot 12 returns with the punch stirrup 21 to the stand 18 and changes the punch stirrup for the aforesaid gripping device, with which the robot collects the workpiece from the fixture 14 and places the workpiece in the output magazine 22. The working sequence is therewith terminated, and can be immediately repeated.

We claim:

1. A method for fitting nuts to a sheet-metal workpiece, by punching the nuts into the sheet metal, characterized by securing the workpiece in a stationary fixture; mounting a portable nut punching tool on a tool attachment provided on the wrist of an industrial robot for moving said punching tool from a tool storage location to said workpiece in said fixture; with the aid of the robot positioning the nut punching tool sequentially in pre-determined locations on the workpiece to which nuts are to be fitted and secured; and activating the nut punching tool for fitting a nut to the workpiece by punching the nut thereinto.

2. A method according to claim 1, characterized by collecting the workpiece from an input magazine with the aid of a gripping device fitted to the robot, and placing the workpiece in the fixture; exchanging the gripping device for the portable nut punching tool, which has been loaded with the requisite type of nut and the required number of nuts either prior to being collected or subsequent thereto; punching the nuts into the workpiece; exchanging the nut punching tool for the gripping device; and removing the workpiece from the fixture with the aid of the gripping device and placing the workpiece in an output magazine.

3. A method according to claim 1 or 2 for fitting nuts into mutually different sheet-metal workpieces, characterized by placing the different workpieces in a common input magazine; identifying the workpiece to be collected; selecting in dependence on the workpiece identified a program which is effective to cause the robot to collect the particular gripping device intended for collecting the identified workpiece and placing said workpiece in the fixture; to load the nut punching tool with the number of nuts and type of nut intended for the identified workpiece; and to cause the robot to exchange the gripping device for the nut punching tool and to punch nuts into the workpiece in a pre-determined sequence and then to exchange the nut punching tool for the gripping device with which the workpiece is removed from the fixture and placed in the output magazine.

4. A method according to claim 2, characterized by loading the nut punching tool for one and the same working sequence as required with nuts of mutually different screwthread dimensions in accordance with the punching program selected for the identified workpiece.

5. A robot installation for fitting nuts to a sheet-metal workpiece by punching the nuts thereinto, characterized in that the installation comprises a portable nut punching tool which can be detachably connected to a tool attachment provided on the wrist of an industrial robot said industrial robot having a wrist with a tool attachment thereon for moving said portable nut punching tool from a storage location to predetermined locations on the workpiece; and further comprises a stationary fixture for holding the workpiece during a nut punching operation.

6. An installation according to claim 5, characterized in that the installation further comprises an input magazine for workpieces of the same or different kind into which nuts are to be punched; means for loading nuts into a nut magazine in the nut punching tool; an output magazine for receiving punched workpieces; and a tool magazine for one or more gripping devices each provided with means for detachably connecting the gripping device to the robot for magazine, the fixture and the output magazine.

7. An installation according to claim 5 or 6, characterized in that the nut punching tool is mounted in a substantially C-shaped bracket structure, the one punch component of the punching tool being mounted on one leg of the bracket structure, while the die component of the punching tool is mounted on the other leg of the bracket structure opposite said one punch component.

8. An installation according to claim 7, characterized in that the bracket structure is made of carbon-fibre reinforced plastics material.

* * * * *